United States Patent
Takemae et al.

(10) Patent No.: US 9,607,227 B2
(45) Date of Patent: Mar. 28, 2017

(54) BOUNDARY DETECTION APPARATUS AND BOUNDARY DETECTION METHOD

(71) Applicant: TOYOTA JIDOSHA KABUSHIKI KAISHA, Toyota-shi, Aichi-ken (JP)

(72) Inventors: Yoshinao Takemae, Yokohama (JP); Kiyosumi Kidono, Nagakute (JP); Hiroyuki Ishida, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 11 days.

(21) Appl. No.: 14/662,771

(22) Filed: Mar. 19, 2015

(65) Prior Publication Data

US 2015/0269446 A1 Sep. 24, 2015

(30) Foreign Application Priority Data

Mar. 24, 2014 (JP) ................................ 2014-060463

(51) Int. Cl.
*G06K 9/00* (2006.01)
*G06T 7/00* (2017.01)

(52) U.S. Cl.
CPC ........ *G06K 9/00798* (2013.01); *G06T 7/0042* (2013.01); *G06T 7/0083* (2013.01);
(Continued)

(58) Field of Classification Search
None
See application file for complete search history.

(56) References Cited

U.S. PATENT DOCUMENTS 8,199,975 B2 * 6/2012 Pomerleau ................ B60R 1/00
340/937
8,509,523 B2 * 8/2013 Schamp .............. B60R 21/0134
340/425.5

(Continued)

FOREIGN PATENT DOCUMENTS

JP 2007-18037 A 1/2007
JP 2013-114476 A 6/2013

OTHER PUBLICATIONS

Coughlan, James M., and Huiying Shen. "Terrain Analysis for Blind Wheelchair Users: Computer Vision Algorithms for Finding Curbs and other Negative Obstacles." CVHI. 2007.*

(Continued)

*Primary Examiner* — Hadi Akhavannik
(74) *Attorney, Agent, or Firm* — Sughrue Mion, PLLC

(57) ABSTRACT

A boundary detection apparatus includes an acquisition unit, an extraction unit and a detection unit. The acquisition unit acquires a disparity image based on information obtained by capturing an image of a peripheral environment of a vehicle. The extraction unit extracts predetermined pixel regions from first and second pixel regions of the disparity image based on a disparity gradient direction of the first pixel region and a disparity gradient direction of the second pixel region. The detection unit detects a boundary of a step surface existing alongside a road by joining together at least some of the predetermined pixel regions extracted by the extraction unit. The first and second pixel regions sandwich the predetermined pixel region. An angle formed by the disparity gradient direction of the first pixel region and the disparity gradient direction of the second pixel region is within a predetermined angular range of a right angle.

8 Claims, 9 Drawing Sheets

(52) U.S. Cl.
CPC ............... *G06K 9/00208* (2013.01); *G06T 2207/10012* (2013.01); *G06T 2207/10028* (2013.01); *G06T 2207/30256* (2013.01)

(56) References Cited

U.S. PATENT DOCUMENTS

| | | | | |
|---|---|---|---|---|
| 9,330,321 | B2* | 5/2016 | Schamp | G06K 9/00805 |
| 2012/0069185 | A1* | 3/2012 | Stein | G06K 9/00798 |
| | | | | 348/148 |
| 2012/0249789 | A1* | 10/2012 | Satoh | G06K 9/00805 |
| | | | | 348/143 |
| 2014/0160244 | A1* | 6/2014 | Berberian | G06K 9/00798 |
| | | | | 348/46 |

OTHER PUBLICATIONS

Turchetto et al., "Visual Curb Localization for Autonomous Navigation", Proceedings 2003 IEEE/RSJ International Conference on Intelligent Robots and Systems (IROS 2003) (Cat. No. 03CH37453), Oct. 27, 2003, vol. 2, pp. 1336-1342, XP055208209.
Geiger et al., "Efficient Large-Scale Stereo Matching," Proc. Asian Conf. on Computer Vision, Queenstown, New Zealand, Nov. 2010.
Johnson, "The NLopt nonlinear-optimization package," http://ab-initio.mit.edu/nlopt, pp. 1-3 (3 pages total).

* cited by examiner

BOUNDARY DETECTION APPARATUS AND BOUNDARY DETECTION METHOD

INCORPORATION BY REFERENCE

The disclosure of Japanese Patent Application No. 2014-060463, filed on Mar. 24, 2014 including the specification, drawings and abstract, is incorporated herein by reference in its entirety.

BACKGROUND OF THE INVENTION

1. Field of the Invention

The invention relates to a boundary detection apparatus and a boundary detection method.

2. Description of Related Art

A method of identifying an object from an image is available in the related art. Japanese Patent Application Publication No. 2013-114476 (JP 2013-114476 A), for example, discloses a technique relating to an object identification method in which gradients of surfaces in respective locations of a disparity image serving as an identification subject are determined, a position and a direction of a fold between the surfaces of the disparity image are extracted as feature information of the identification subject from a connection condition of the gradients of the surfaces, and the type of the identification subject is determined on the basis of the extracted feature information.

It is desirable to be able to detect a boundary between step surfaces with a high degree of precision on the basis of a disparity image. For example, a point at which a disparity value varies may be detected as a boundary. In a region captured from afar, however, the disparity value is small. It is therefore difficult in a region captured from afar to extract the point at which the disparity value varies as a boundary with a high degree of precision.

SUMMARY OF THE INVENTION

The invention provides a boundary detection apparatus and a boundary detection method with which a boundary between step surfaces can be detected with a high degree of precision.

A boundary detection apparatus according to a first aspect of the invention includes an acquisition unit, an extraction unit and a detection unit. The acquisition unit is configured to acquire a disparity image based on information obtained by capturing an image of a peripheral environment of a vehicle. The disparity image includes a first pixel region and a second pixel region. The extraction unit is configured to extract predetermined pixel regions from the first pixel region and the second pixel region based on a disparity gradient direction of the first pixel region and a disparity gradient direction of the second pixel region. The detection unit is configured to detect a boundary of a step surface existing alongside a road by joining together at least some of the predetermined pixel regions extracted by the extraction unit. The first pixel region and the second pixel region sandwich the predetermined pixel region. An angle formed by the disparity gradient direction of the first pixel region and the disparity gradient direction of the second pixel region is within a predetermined angular range of a right angle.

With the boundary detection apparatus according to the first aspect of the invention, a boundary between step surfaces can be detected with a high degree of precision. For example, a boundary between step surfaces can be detected with a high degree of precision even in an image region captured from afar.

In the first aspect of the invention, the first pixel region may include a first pixel and a second pixel. The second pixel region may include a third pixel and a fourth pixel. The first pixel and the third pixel may be positioned on either side of the predetermined pixel region in a first direction. An angle formed by a first disparity gradient direction of the first pixel and a third disparity gradient direction of the third pixel may be within a predetermined angular range of a right angle. The second pixel and the fourth pixel may be positioned on either side of the predetermined pixel region in a second direction that is substantially orthogonal to the first direction. An angle formed by a second disparity gradient direction of the second pixel and a fourth disparity gradient direction of the fourth pixel may be within a predetermined angular range of a right angle.

In the above boundary detection apparatus, the extraction unit may be configured to determine whether the predetermined pixel region constitutes a boundary on an upper side or a lower side of the step surface based on the first disparity gradient direction of the first pixel, the second disparity gradient direction of the second pixel, the third disparity gradient direction of the third pixel, and the fourth disparity gradient direction of the fourth pixel. The detection unit may be configured to join together the predetermined pixel regions determined to constitute the boundary on the upper side of the step surface, and to join together the predetermined pixel regions determined to constitute the boundary on the lower side of the step surface.

In the above boundary detection apparatus, the extraction unit may be configured to determine whether the predetermined pixel region constitutes a boundary of the step surface positioned on a left side or a right side of the road based on the first disparity gradient direction of the first pixel, the second disparity gradient direction of the second pixel, the third disparity gradient direction of the third pixel, and the fourth disparity gradient direction of the fourth pixel. The detection unit may be configured to join together the predetermined pixel regions determined to constitute the boundary of the step surface positioned on the left side, and to join together the predetermined pixel regions determined to constitute the boundary of the step surface positioned on the right side.

A boundary detection method according to a second aspect of the invention includes: acquiring a disparity image based on information obtained by capturing an image of a peripheral environment of a vehicle, the disparity image including a first pixel region and a second pixel region; extracting predetermined pixel regions from the first pixel region and the second pixel region based on a disparity gradient direction of the first pixel region and a disparity gradient direction of the second pixel region; and detecting a boundary of a step surface existing alongside a road by joining together at least some of the extracted predetermined pixel regions. The first pixel region and the second pixel region sandwich the predetermined pixel region. An angle formed by the disparity gradient direction of the first pixel region and the disparity gradient direction of the second pixel region is within a predetermined angular range of a right angle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A boundary detection apparatus and a boundary detection method according to an embodiment of the invention will be described in detail below with reference to the drawings. Note that the invention is not limited to this embodiment. Moreover, constituent elements of the embodiment described below include substantially identical elements or elements that could be envisaged easily by persons skilled in the art.

First Embodiment

Figure 1:
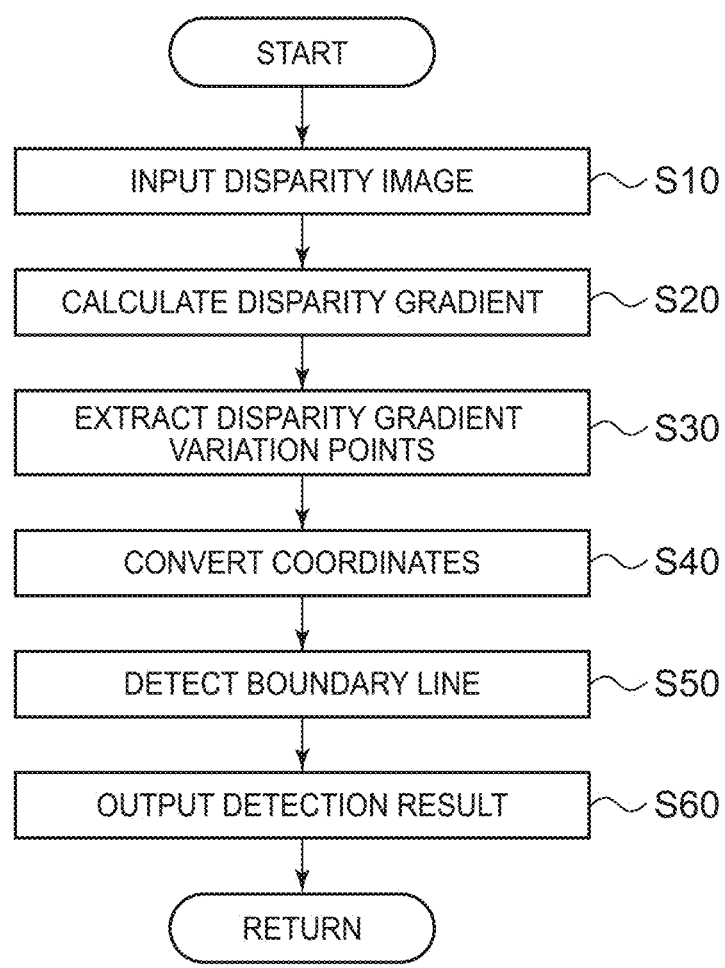
FIG. 1 is a flowchart showing an operation according to an embodiment.
Figure 2:
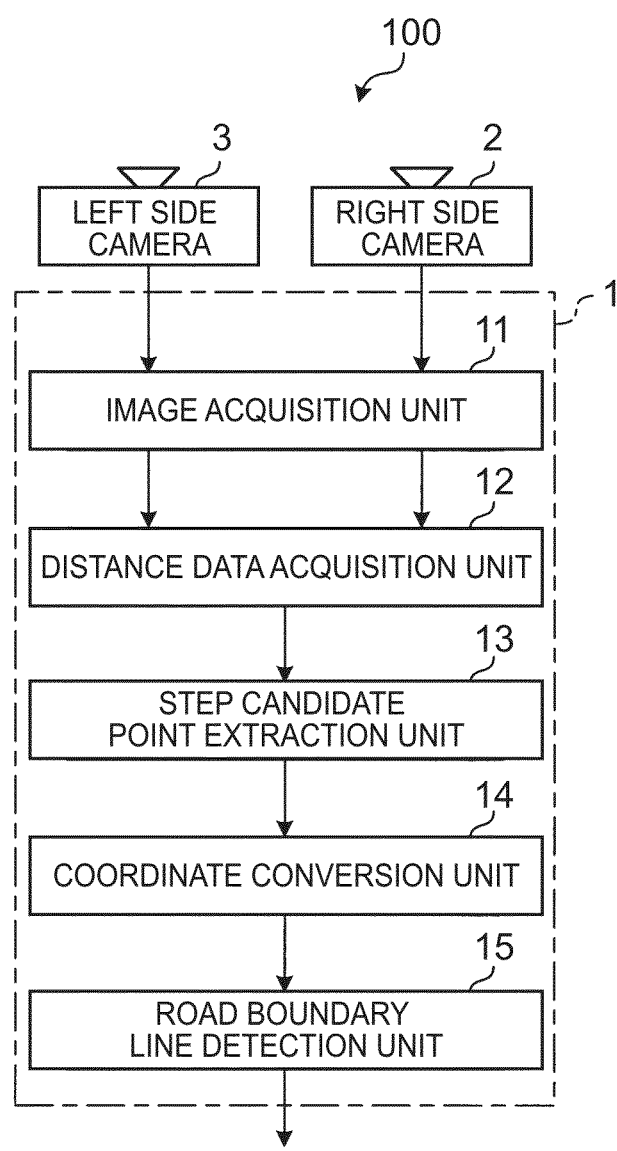
FIG. 2 is a schematic block diagram showing a configuration of a boundary detection apparatus according to this embodiment.
Figure 3:
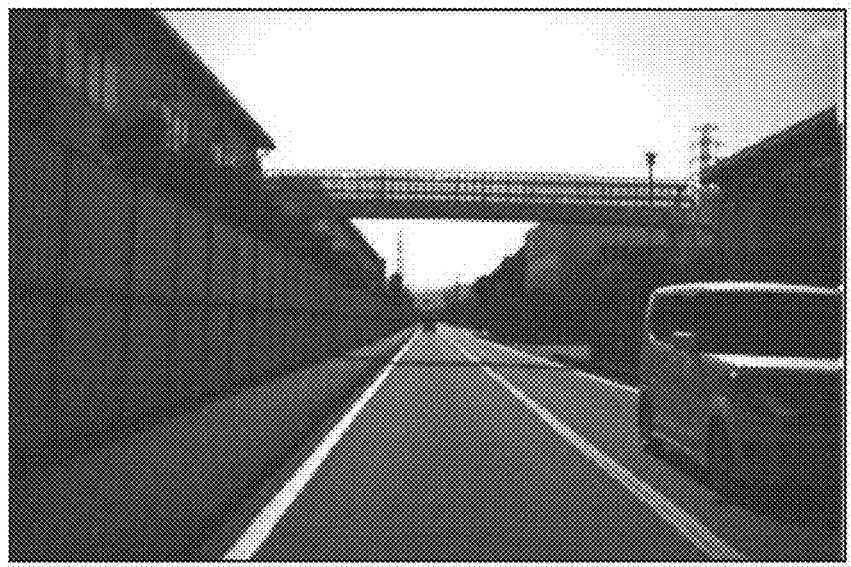
FIG. 3 is a view showing an example of image data.
Figure 4:
FIG. 4 is a view showing an example of a range image.
Figure 5:
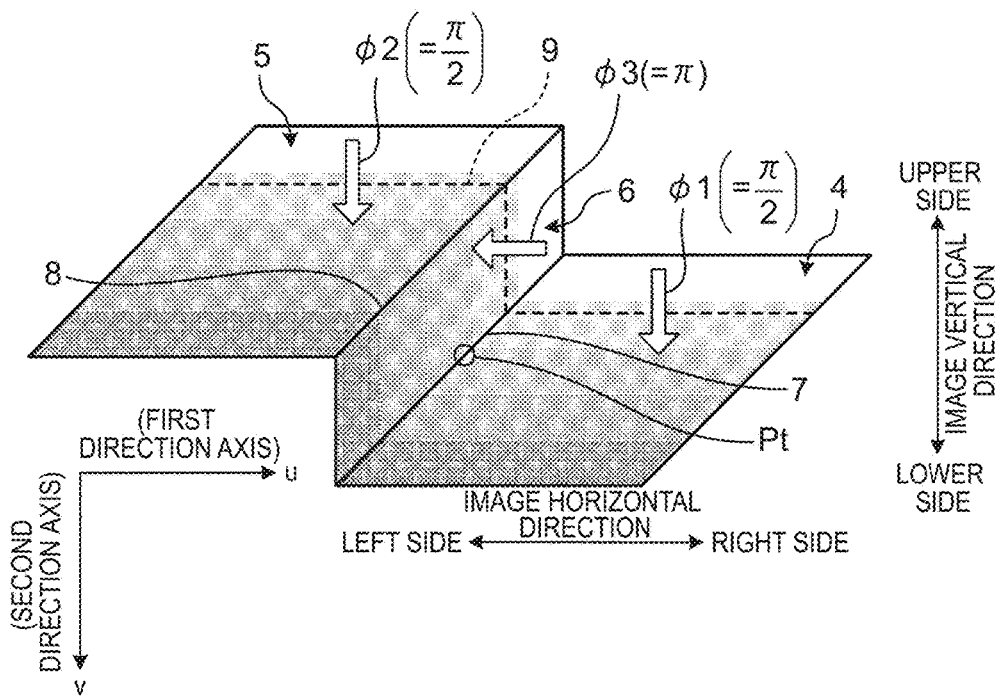
FIG. 5 is an illustrative view of disparity gradient directions.
Figure 6:
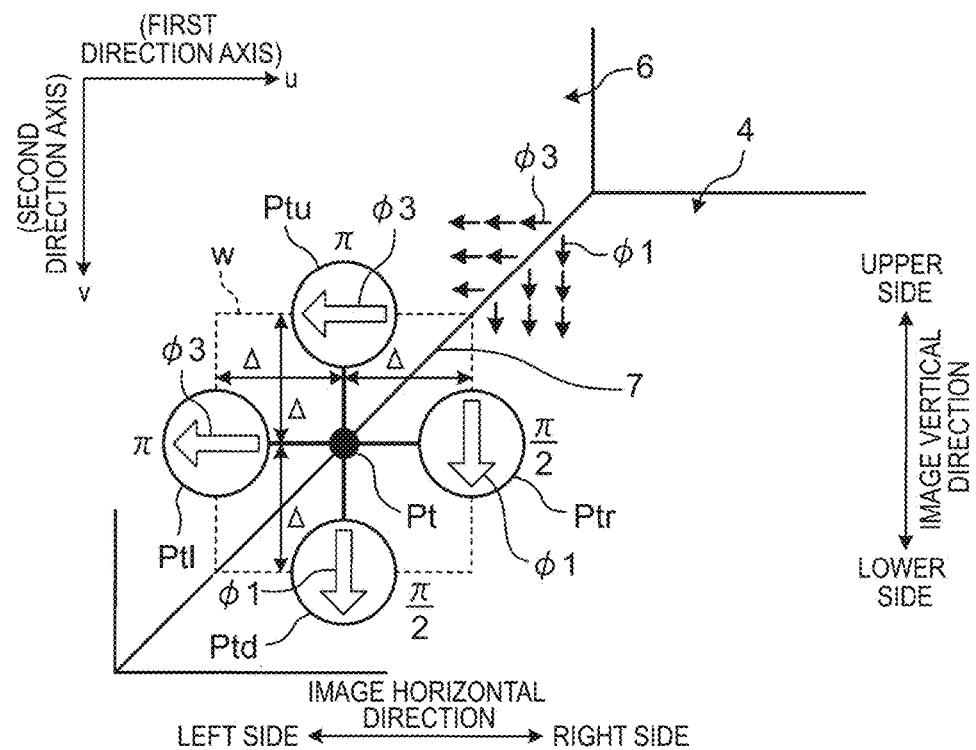
FIG. 6 is a view illustrating a method of extracting a predetermined pixel region.
Figure 7:
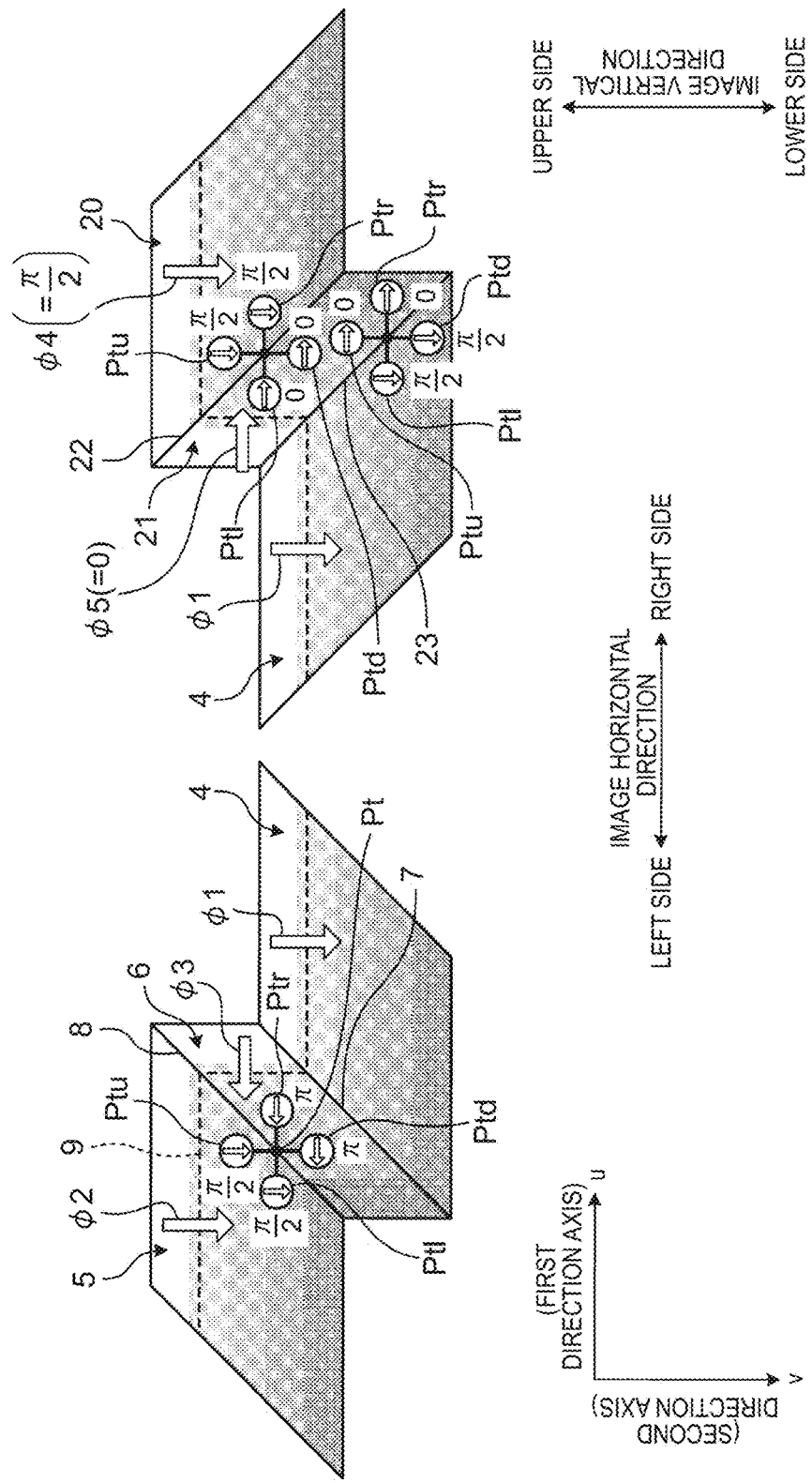
FIG. 7 is another view illustrating disparity gradient directions.
Figure 8:
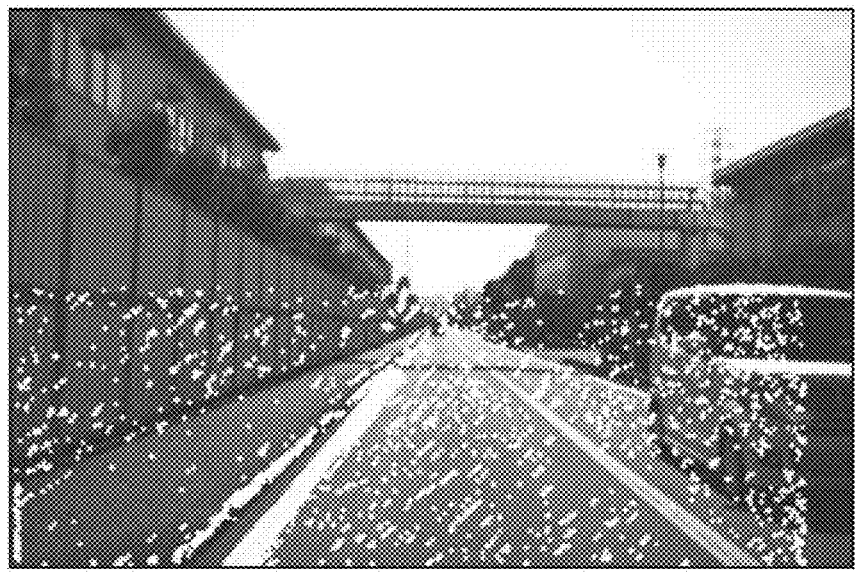
FIG. 8 is a view showing an example of an upper end region extraction result.
Figure 9:
FIG. 9 is a view showing an example of a lower end region extraction result.
Figure 10:
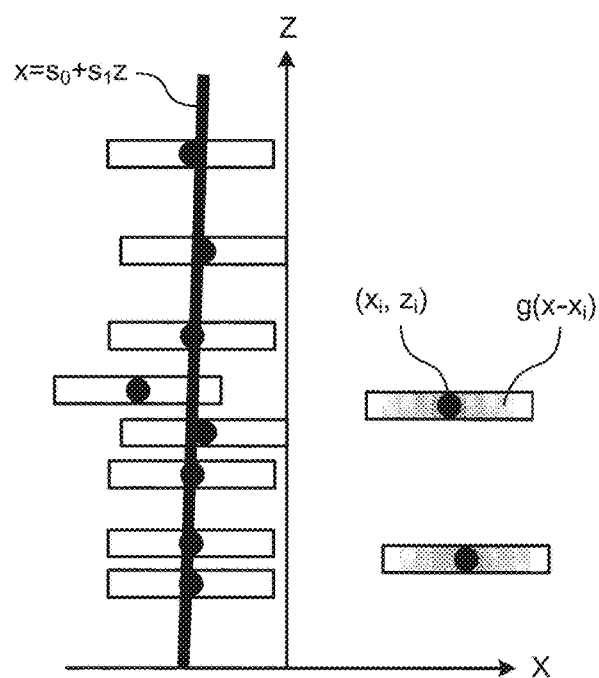
FIG. 10 is an illustrative view relating to straight line fitting processing.
Figure 11:
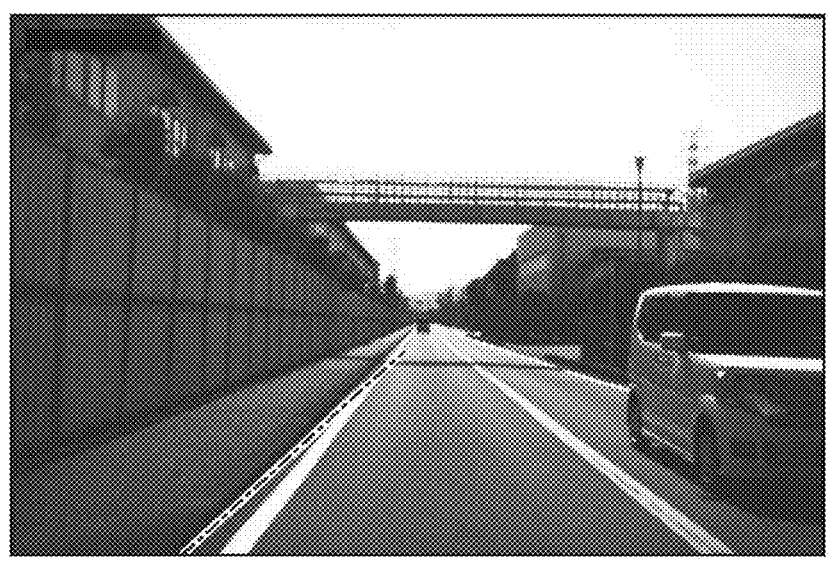
FIG. 11 is a view showing an example of a boundary line detection result.

A first embodiment will be described with reference to FIGS. 1 to 11. This embodiment relates to a boundary detection apparatus and a boundary detection method. FIG. 1 is a flowchart showing an operation according to this embodiment of the invention. FIG. 2 is a schematic block diagram showing a configuration of the boundary detection apparatus according to this embodiment. FIG. 3 is a view showing an example of image data. FIG. 4 is a view showing an example of a range image. FIG. 5 is an illustrative view of disparity gradient directions. FIG. 6 is a view illustrating a method of extracting a predetermined pixel region. FIG. 7 is another view illustrating disparity gradient directions. FIG. 8 is a view showing an example of an upper end region extraction result. FIG. 9 is a view showing an example of a lower end region extraction result. FIG. 10 is an illustrative view relating to straight line fitting processing. FIG. 11 is a view showing an example of a boundary line detection result.

The boundary detection apparatus and boundary detection method according to this embodiment are used to detect, on the basis of a range image, a road boundary position in which height variation occurs mainly in step form. For example, the road boundary position corresponds to a position of a curb, an edge of a sidewalk, or a gutter. To detect a road boundary such as a curb, a method of calculating height information from the range image and extracting a location in which height variation occurs may be used. However, since a height difference between an upper surface of a curb and a road surface is only approximately 10 to 20 cm, and the range image itself may include an error, it is difficult to detect a distant curb with a high degree of precision. The boundary detection apparatus and boundary detection method according to this embodiment have been designed in response to this problem, and provide a method of extracting a road boundary constituted by a step such as a curb directly from a range image.

A boundary detection apparatus 1 shown in FIG. 2 is used to detect a solid road boundary, and is installed in a vehicle 100, for example, in order to detect a solid road boundary in front of the vehicle 100. In this specification, a solid road boundary is a boundary of a step surface existing alongside a road. The boundary is typically an outer corner portion on an upper end of the step surface or an inner corner portion on a lower end of the step surface. A side face of a curb disposed along the road may be cited as a typical example of the step surface. In this embodiment, a case in which boundary lines at an upper end and a lower end of the side face of a curb are detected as solid road boundaries will be described as an example.

As shown in FIG. 2, the boundary detection apparatus 1 according to this embodiment includes an image acquisition unit 11, a distance data acquisition unit 12, a step candidate point extraction unit 13, a coordinate conversion unit 14, and a road boundary line detection unit 15. In this embodiment, the distance data acquisition unit 12 functions as an acquisition unit, the step candidate point extraction unit 13 functions as an extraction unit, and the road boundary line detection unit 15 functions as a detection unit. The boundary detection apparatus 1 according to this embodiment may be an electronic control unit (ECU) including the image acquisition unit 11, the distance data acquisition unit 12, the step candidate point extraction unit 13, the coordinate conversion unit 14, and the road boundary line detection unit 15.

A right side camera 2 and a left side camera 3 are installed in the vehicle 100. The right side camera 2 and the left side camera 3 respectively capture images of a peripheral environment of the vehicle 100. The right side camera 2 and the left side camera 3 according to this embodiment are installed in a front portion of the vehicle 100 in order to capture images of the environment in front of the vehicle 100. The right side camera 2 and the left side camera 3 according to this embodiment together constitute a stereo camera. The right side camera 2 and the left side camera 3 are disposed adjacent to each other in a vehicle width direction of the vehicle 100 such that respective optical axes thereof are parallel.

A stereo image is generated by having the right side camera 2 and the left side camera 3 capture images either simultaneously or at close timings. Image data captured and generated respectively by the right side camera 2 and the left side camera 3 are transmitted to the image acquisition unit 11. The image acquisition unit 11 acquires brightness images from the left and right side cameras 2, 3 having a stereo configuration at identical timings. The image acquisition unit 11 outputs an image capture command signal to the right side camera 2 and the left side camera 3 to cause the right side camera 2 and the left side camera 3 to capture images at synchronized timings. For example, the image acquisition unit 11 causes the right side camera 2 and the left side camera 3 to capture images of the front of the vehicle at a predetermined frame rate. Further, the image acquisition unit 11 acquires image information generated by the right side camera 2 and the left side camera 3. The image information generated by the respective cameras 2, 3 indicates associations between a position of each pixel on the image and information indicating the brightness and color of the pixel. Note that the image acquisition unit 11 may use the method described in A. Geiger, M. Roser and, R. Urtasun: "Efficient Large-Scale Stereo Matching", Proc. Asian Conf. on Computer Vision, Queenstown, New Zealand, November 2010, for example.

The distance data acquisition unit 12 functions as an acquisition unit that acquires a disparity image on the basis of the information obtained by capturing images of the peripheral environment of the vehicle. The distance data acquisition unit 12 calculates a disparity serving as three-dimensional distance information by finding correspondences between identical points on the images acquired from the left and right side cameras 2, 3. In other words, the distance data acquisition unit 12 acquires a disparity image by calculating distance data on the basis of the image information generated by the right side camera 2 and the image information generated by the left side camera 3. Note that in this specification, the image information generated by the right side camera 2 will be referred to as "right side image information", and the image information generated by the left side camera 3 will be referred to as "left side image information". For example, the distance data acquisition unit 12 extracts a pixel (referred to simply as a "corresponding pixel" hereafter) corresponding to a focus pixel of the right side image information from the left side image information. The corresponding pixel is the pixel having the highest degree of correlation with the focus pixel among the pixels of the left side image information. The distance data acquisition unit 12 calculates a shift amount between a position of the focus pixel in the right side image information and a position of the corresponding pixel in the left side image information as a value (a magnitude) of a disparity of the pixel.

The distance data acquisition unit 12 calculates the disparity value of each pixel of the right side image information, and associates the calculated disparity value with the position of the pixel. The distance data acquisition unit 12 may acquire the disparity image using the method described in A. Geiger, M. Roser and, R. Urtasun: "Efficient Large-Scale Stereo Matching", Proc. Asian Conf. on Computer Vision, Queenstown, New Zealand, November 2010, as described above, for example. The disparity image is information indicating the disparity values of the respective pixels of an image, acquired in the manner described above. FIG. 3 shows the left side image information as an example of image information. FIG. 4 shows a range image (a disparity image) generated on the basis of the left side image information shown in FIG. 3 and right side image information corresponding thereto. The disparity value increases steadily as the distance from the cameras 2, 3 decreases. On the disparity image shown in FIG. 4, pixels having large disparity values, or in other words pixels obtained by capturing images of imaging subjects close to the cameras 2, 3, have low brightness (appear black). On the other hand, pixels having small disparity values, or in other words pixels obtained by capturing images of imaging subjects far from the cameras 2, 3, have high brightness (appear white). The disparity values are expressed similarly in other drawings showing disparity images.

The step candidate point extraction unit 13 functions as an extraction unit that extracts predetermined pixel regions from respective pixel regions constituting the disparity image on the basis of respective disparity gradient directions of the pixel regions. The step candidate point extraction unit 13 according to this embodiment extracts step-shaped step candidate points from the disparity image serving as the distance data.

First, referring to FIG. 5, the disparity gradient direction will be described. FIG. 5 is a schematic view showing a part of a disparity image. The image shown in FIG. 5 includes a road surface region 4, a sidewalk region 5, and a step surface region 6. The road surface region 4 is a region, among the respective image regions included in the disparity image, obtained by capturing an image of a road surface in front of the vehicle 100. The sidewalk region 5 is a region obtained by capturing an image of a sidewalk adjacent to the road surface. The sidewalk region 5 in FIG. 5 is obtained by capturing an image of an upper surface of a sidewalk provided on a left side of the road surface of the road in the vehicle width direction. The step surface region 6 is a region obtained by capturing an image of a surface that connects the road surface to the upper surface of the sidewalk, for example a region obtained by capturing an image of a side face of a curb. The step surface region 6 according to this embodiment is a region obtained by capturing an image of a surface that is orthogonal or substantially orthogonal to the road surface and the upper surface of the sidewalk.

Note that on the disparity image, the vehicle width direction corresponds to an image horizontal direction. Unless noted otherwise, when positions on the disparity image are described in the following description, it is assumed that "horizontal direction" indicates the image horizontal direction, and "vertical direction" indicates an image vertical direction. Further, when describing positions on the disparity image, it is assumed that "left side" and "right side" respectively indicate a left side and a right side in the image horizontal direction, while "upper side" and "lower side" respectively indicate an upper side and a lower side in the image vertical direction.

An equal disparity line 9 shown in FIG. 5 is a line connecting pixels of the disparity image that have equal disparity values. As shown in FIG. 5, in the road surface region 4 and the sidewalk region 5, the equal disparity line 9 can be drawn along the image horizontal direction. In the road surface region 4 and the sidewalk region 5, a degree of variation in the disparity value is greatest in an orthogonal direction to the equal disparity line 9, or in other words the image vertical direction. For example, when amounts of variation between the disparity values of pixels that are apart from each other by a predetermined distance on the image are calculated in the road surface region 4 and the sidewalk region 5, the amount of variation between the disparity values of pixels arranged in an orthogonal direction to the equal disparity line 9, from among the various directions, is greatest. Further, in the road surface region 4 and the sidewalk region 5, the disparity value increases steadily toward the lower side in the image vertical direction. In other words, in the road surface region 4 and the sidewalk region 5, the disparity value increases at the highest increase rate from the upper side toward the lower side in the image vertical direction. In this specification, a direction of the disparity image in which the disparity value increases at the highest increase rate in this manner will be referred to as the "disparity gradient direction".

In this embodiment, the disparity gradient direction of the disparity image is expressed by an angle φ [rad]. The angle of the disparity gradient direction φ is a counterclockwise angle in which a direction heading toward the right side of the image horizontal direction is 0 [rad]. Accordingly, a disparity gradient direction $\phi1$ of the road surface region 4 and a disparity gradient direction $\phi2$ of the sidewalk region 5 are respectively $\pi/2$.

In the step surface region 6, the equal disparity line 9 can be drawn along the image vertical direction. In the step surface region 6, the degree of variation in the disparity value is greatest in an orthogonal direction to the equal disparity line 9, or in other words the image horizontal direction. Further, in the step surface region 6, which is obtained by capturing an image of a step surface on the left side of the road surface, the disparity value increases steadily toward the left side in the image horizontal direction. In other words, in the left side step surface region 6, the disparity value increases at the highest increase rate from the right side to the left side in the image horizontal direction. Accordingly, a disparity gradient direction $\phi3$ of the left side step surface region 6 is $\pi$.

Hence, in the two regions 4, 5 obtained by capturing images of horizontal surfaces and the step surface region 6 obtained by capturing an image of the step surface that connects the two horizontal surfaces, the disparity gradient directions $\phi$ are orthogonal or substantially orthogonal. The boundary detection apparatus 1 according to this embodiment detects the solid road boundary on the basis of variation in the disparity gradient directions $\phi$ of adjacent regions.

More specifically, the step candidate point extraction units 13 extracts pixel regions serving as candidates of pixels constituting a lower side boundary line 7 and an upper side boundary line 8. Here, the lower side boundary line 7 is a pixel region obtained by capturing an image of a boundary between the step surface region 6 and the road surface region 4. In other words, the lower side boundary line 7 is a pixel region obtained by capturing an image of a recessed curve portion between the road surface and the step surface. The upper side boundary line 8 is a pixel region obtained by capturing an image of a boundary between the step surface region 6 and the sidewalk region 5. In other words, the upper side boundary line 8 is a pixel region obtained by capturing an image of a projecting curved portion between the upper surface of the sidewalk and the step surface.

Referring to FIG. 6, an extraction method will be described. FIG. 6 shows a focus pixel Pt, and a left side pixel Ptl, a right side pixel Ptr, an upper side pixel Ptu, and a lower side pixel Ptd on the periphery of the focus pixel Pt. In this embodiment, distances (pixel counts) $\Delta$ between the focus pixel Pt and the respective peripheral pixels Ptl, Ptr, Ptu, and Ptd are identical. In other words, the left side pixel Ptl is apart from the focus pixel Pt by the distance $\Delta$ to the left side, and the right side pixel Ptr is apart from the focus pixel Pt by the distance $\Delta$ to the right side. The upper side pixel Ptu is apart from the focus pixel Pt by the distance $\Delta$ to the upper side, and the lower side pixel Ptd is apart from the focus pixel Pt by the distance $\Delta$ to the lower side. The step candidate point extraction unit 13 determines whether or not the focus pixel Pt is a pixel on the boundary lines 7, 8 on the basis of the amount of variation in the disparity gradient direction $\phi$ within a window w, which is determined from the pixels Ptl, Ptr, Ptu, Ptd.

As shown in FIG. 6, when the focus pixel Pt is a pixel on the lower side boundary line 7, the left side pixel Ptl and the upper side pixel Ptu are respectively within the step surface region 6, while the right side pixel Ptr and the lower side pixel Ptd are respectively within the road surface region 4. Accordingly, the disparity gradient directions $\phi$ of the left side pixel Ptl and the upper side pixel Ptu are $\pi$. Meanwhile, the disparity gradient directions $\phi$ of the right side pixel Ptr and the lower side pixel Ptd are $\pi/2$. In other words, when a desired pixel of the disparity image is set as the focus pixel Pt, and the disparity gradient directions $\phi$ of the left side pixel Ptl and the upper side pixel Ptu are $\pi$ or an angle in the vicinity of $\pi$ while the disparity gradient directions $\phi$ of the right side pixel Ptr and the lower side pixel Ptd are $\pi/2$ or an angle in the vicinity of $\pi/2$, the focus pixel Pt can be set as a candidate of a pixel constituting the lower side boundary line 7.

The step candidate point extraction unit 13 sets the respective pixels of the disparity image as the focus pixel Pt, calculates the disparity gradient directions $\phi$ of the left side pixel Ptl, the right side pixel Ptr, the upper side pixel Ptu, and the lower side pixel Ptd on the periphery of the focus pixel Pt, and extracts candidate points of the lower side boundary line 7 on the basis of values of the disparity gradient directions $\phi$ and combinations of the disparity gradient directions $\phi$. Note that in this specification, a pixel or a pixel region extracted as a candidate of a pixel constituting a step surface boundary will be referred to as a "step candidate point". The step candidate point is an example of a predetermined pixel region extracted by the extraction unit.

Similarly, the step candidate point extraction unit 13 extracts candidates of pixels constituting the upper side boundary line 8 on the basis of values and combinations of the disparity gradient directions $\phi$ of the left side pixel Ptl, the right side pixel Ptr, the upper side pixel Ptu, and the lower side pixel Ptd. As is evident from FIG. 7, a focus pixel Pt in relation to which the disparity gradient directions $\phi$ of the left side pixel Ptl and the upper side pixel Ptu are $\pi/2$ or an angle in the vicinity of $\pi/2$ and the disparity gradient directions $\phi$ of the right side pixel Ptr and the lower side pixel Ptd are $\pi$ or an angle in the vicinity of $\pi$ may be set as a candidate of a pixel constituting the upper side boundary line 8.

Further, as described with reference to FIG. 7, step candidate points can be extracted in relation to a step surface existing on the right side of the road surface. FIG. 7 shows a sidewalk region 20 and a step surface region 21 in addition to the respective regions 4, 5, 6 shown in FIG. 6. The sidewalk region 20 is a region of the disparity image obtained by capturing an image of a sidewalk disposed on the right side of the road surface in front of the vehicle 100 in the vehicle width direction. The step surface region 21 is a region of the disparity image obtained by capturing an image of a step surface that connects the road surface in front of the vehicle 100 to an upper surface of the right side sidewalk. A lower side boundary line 23 is a pixel region obtained by capturing an image of a boundary between the road surface region 4 and the right side step surface region 21. An upper side boundary line 22 is a pixel region obtained by capturing an image of a boundary between the right side step surface region 21 and the sidewalk region 20.

A disparity gradient direction $\phi4$ of the right side sidewalk region 20 is $\pi/2$, and a disparity gradient direction $\phi5$ of the right side step surface region 21 is 0. As regards the step on the right side of the road surface, when the focus pixel Pt is a pixel on the boundary lines 22, 23, the respective disparity gradient directions $\phi$ of the left side pixel Ptl and the lower side pixel Ptd are equal, and the respective disparity gradient directions $\phi$ of the right side pixel Ptr and the upper side pixel Ptu are equal. For example, when the focus pixel Pt is on the lower side boundary line 23, the disparity gradient directions $\phi$ of the left side pixel Ptl and the lower side pixel Ptd are $\pi/2$ or an angle in the vicinity of $\pi/2$, while the disparity gradient directions $\phi$ of the right side pixel Ptr and the upper side pixel Ptu are 0 or an angle in the vicinity of 0. Further, when the focus pixel Pt is on the upper side boundary line 22, the disparity gradient directions ϕ of the left side pixel Ptl and the lower side pixel Ptd are 0 or an angle in the vicinity of 0, while the disparity gradient directions ϕ of the right side pixel Ptr and the upper side pixel Ptu are $\pi/2$ or an angle in the vicinity of $\pi/2$.

An extraction method used by the step candidate point extraction unit 13 will now be described with reference to numerical expressions. The step candidate point extraction unit 13 calculates the disparity gradient direction ϕ of a subject pixel using Expression (1), shown below. Note that (u, v) indicates a position of the subject pixel within the disparity image. As shown in FIG. 7, a u axis is an axis of the image horizontal direction, which is positive when heading toward the right side. A v axis is an axis of the image vertical direction, which is positive when heading toward the lower side. In this embodiment, the u axis and the v axis are orthogonal.

$$\phi(u,v)=\tan^{-1}\left[(d(u,v+\Delta)-d(u,v-\Delta))/(d(u-\Delta,v)-d(u-\Delta,v))\right] \quad (1)$$

Note that d (u, v) is the disparity value of a pixel in a position (u, v) within the disparity image.

The step candidate point extraction unit 13 calculates an amount of variation between the disparity gradient directions ϕ of two pixels positioned on either side of the focus pixel Pt. As described with reference to FIG. 6, when the focus pixel Pt is a point on the lower side boundary line 7, an angle difference between the disparity gradient direction ϕ $(=\pi)$ of the left side pixel Ptl and the disparity gradient direction ϕ $(=\pi/2)$ of the right side pixel Ptr is a large angle close to a right angle. Further, an angle difference between the disparity gradient direction ϕ $(=\pi)$ of the upper side pixel Ptu and the disparity gradient direction ϕ $(=\pi/2)$ of the lower side pixel Ptd is a large angle close to a right angle.

Similarly, when the focus pixel Pt is a point on the upper side boundary line 8, an angle formed by the respective disparity gradient directions ϕ of the left side pixel Ptl and the right side pixel Ptr is a large angle close to a right angle, and an angle formed by the respective disparity gradient directions ϕ of the lower side pixel Ptd and the upper side pixel Ptu is a large angle close to a right angle. These angle difference conditions are established likewise in relation to the upper side boundary line 22 and the lower side boundary line 23. In other words, when, in relation to the focus pixel Pt, the angle formed by the disparity gradient direction ϕ of the upper side region and the disparity gradient direction ϕ of the lower side region is within a predetermined angular range of a right angle and the angle formed by the disparity gradient direction ϕ of the left side region and the disparity gradient direction ϕ of the right side region is within a predetermined angular range of a right angle, the focus pixel Pt can be determined to be a pixel constituting one of the boundary lines 7, 8, 22, 23.

The predetermined angular range may be set as a range of 0 degrees to ±45 degrees relative to a right angle, for example. Alternatively, the predetermined angular range may be set as a range of 0 degrees to ±30 degrees relative to a right angle. Further, the predetermined angular range may be set as a range of 0 degrees to ±15 degrees relative to a right angle. The predetermined angle may be set at another appropriate value in accordance with conditions. Furthermore, the predetermined angular range applied to the angle formed by the disparity gradient direction ϕ of the upper side region and the disparity gradient direction ϕ of the lower side region relative to the focus pixel Pt and the predetermined angular range applied to the angle formed by the disparity gradient direction ϕ of the left side region and the disparity gradient direction ϕ of the right side region relative to the focus pixel Pt may be different angular ranges. Alternatively, the predetermined angular range used to extract a projecting portion (an outer corner portion) may be different to the predetermined angular range use to extract a recessed portion (an inner corner portion).

The step candidate point extraction unit 13 calculates an amount of variation Pu (u, v) of the disparity gradient direction ϕ $(u-\Delta, v)$ of the left side pixel Ptl relative to the disparity gradient direction ϕ $(u+\Delta, v)$ of the right side pixel Ptr using Expression (2), shown below.

$$Pu(u,v)=\sin\left[\phi(u+\Delta,v)-\phi(u-\Delta,v)\right] \quad (2)$$

Further, the step candidate point extraction unit 13 calculates an amount of variation Pv (u, v) of the disparity gradient direction ϕ $(u, v-\Delta)$ of the upper side pixel Ptu relative to the disparity gradient direction ϕ $(u, v+\Delta)$ of the lower side pixel Ptd using Expression (3), shown below.

$$Pv(u,v)=\sin\left[\phi(u,v+\Delta)-\phi(u,v-\Delta)\right] \quad (3)$$

When sin functions are employed in this manner, the respective variation amounts Pu (u, v), Pv (u, v) take values between −1 and 1. When the disparity gradient directions ϕ in the two regions sandwiching the focus pixel Pt have identical angles, the values of the respective variation amounts Pu (u, v), Pv (u, v) are 0. When the two regions sandwiching the focus pixel Pt have orthogonal disparity gradient directions ϕ, on the other hand, the values of the respective variation amounts Pu (u, v), Pv (u, v) are either +1 or −1.

In this embodiment, four scores $C_{LL}$, $C_{LR}$, $C_{RL}$, $C_{RR}$ are calculated to determine whether the focus pixel Pt is a pixel constituting one of the boundary lines 7, 8, 22, 23. The first score $C_{LL}$, the second score $C_{LR}$, the third score $C_{RL}$, and the fourth score $C_{RR}$ are respectively defined by Expressions (4), (5), (6), and (7), shown below.

$$C_{LL}=Pu(u,v)+Pv(u,v) \quad (4)$$

$$C_{LR}=-Pu(u,v)-Pv(u,v) \quad (5)$$

$$C_{RL}=-Pu(u,v)+Pv(u,v) \quad (6)$$

$$C_{RR}=Pu(u,v)-Pv(u,v) \quad (7)$$

The first score $C_{LL}$ is a high score when the focus pixel Pt is a pixel constituting the left side upper side boundary line 8, and a low score when the focus pixel Pt is a pixel constituting one of the other boundary lines 7, 22, 23. More specifically, when the focus pixel Pt is on the upper side boundary line 8, as shown in FIG. 7, the disparity gradient directions ϕ of the respective pixels Ptl, Ptr, Ptu, Ptd are as follows.

Left side pixel *Ptl*: $\phi(u-\Delta,v)=\pi/2$

Right side pixel *Ptr*: $\phi(u+\Delta,v)=\pi$

Upper side pixel *Ptu*: $\phi(u,v-\Delta)=\pi/2$

Lower side pixel *Ptd*: $\phi(u,v+\Delta)=\pi$

Hence, the amount of variation in the disparity gradient direction ϕ in the image horizontal direction is determined using Expression (8), shown below, and the amount of variation in the disparity gradient direction ϕ in the image vertical direction is determined using Expression (9), shown below.

$$Pu(u,v)=\sin\left[\pi-\pi/2\right]=1 \quad (8)$$

$$Pv(u,v)=\sin[\pi-\pi/2]=1 \qquad (9)$$

As a result, the value of the first score $C_{LL}$ is +2, the value of the second score $C_{LR}$ is −2, the value of the third score $C_{RL}$ is 0, and the value of the fourth score $C_{RR}$ is 0.

The second score $C_{LR}$ is a high score when the focus pixel Pt is a pixel constituting the left side lower side boundary line 7, and a low score when the focus pixel Pt is a pixel constituting one of the other boundary lines 8, 22, 23. When the focus pixel Pt is on the lower side boundary line 7, as shown in FIG. 6, the disparity gradient directions φ of the respective pixels Ptl, Ptr, Ptu, Ptd are as follows.

Left side pixel Ptl: φ(u−Δ,v)=π

Right side pixel Ptr: φ(u+Δ,v)=π/2

Upper side pixel Ptu: φ(u,v−Δ)=π

Lower side pixel Ptd: φ(u,v+Δ)=π/2

Hence, the amount of variation in the disparity gradient direction φ in the image horizontal direction is determined using Expression (10), shown below, and the amount of variation in the disparity gradient direction φ in the image vertical direction is determined using Expression (11), shown below.

$$Pu(u,v)=\sin[\pi/2-\lambda]=-1 \qquad (10)$$

$$Pv(u,v)=\sin[\pi/2-\pi]=-1 \qquad (11)$$

As a result, the value of the first score $C_{LL}$ is −2, the value of the second score $C_{LR}$ is +2, the value of the third score $C_{RL}$ is 0, and the value of the fourth score $C_{RR}$ is 0.

The third score $C_{RL}$ is a high score when the focus pixel Pt is a pixel constituting the right side lower side boundary line 23, and a low score when the focus pixel Pt is a pixel constituting one of the other boundary lines 7, 8, 22. When the focus pixel Pt is on the lower side boundary line 23, as shown in FIG. 7, the disparity gradient directions φ of the respective pixels Ptl, Ptr, Ptu, Ptd are as follows.

Left side pixel Ptl: φ(u−Δ,v)=π/2

Right side pixel Ptr: φ(u+Δ,v)=0

Upper side pixel Ptu: φ(u,v−Δ)=0

Lower side pixel Ptd: φ(u,v+Δ)=π/2

Hence, the amount of variation in the disparity gradient direction φ in the image horizontal direction is determined using Expression (12), shown below, and the amount of variation in the disparity gradient direction φ in the image vertical direction is determined using Expression (13), shown below.

$$Pu(u,v)=\sin[0-\pi/2]=-1 \qquad (12)$$

$$Pv(u,v)=\sin[\pi/2-0]=1 \qquad (13)$$

As a result, the value of the first score $C_{LL}$ is 0, the value of the second score $C_{LR}$ is 0, the value of the third score $C_{RL}$ is +2, and the value of the fourth score $C_{RR}$ is −2.

The fourth score $C_{RR}$ is a high score when the focus pixel Pt is a pixel constituting the right side upper side boundary line 22, and a low score when the focus pixel Pt is a pixel constituting one of the other boundary lines 7, 8, 23. When the focus pixel Pt is on the upper side boundary line 22, as shown in FIG. 7, the disparity gradient directions φ of the respective pixels Ptl, Ptr, Ptu, Ptd are as follows.

Left side pixel Ptl: φ(u−Δ,v)=0

Right side pixel Ptr: φ(u+Δ,v)=π/2

Upper side pixel Ptu: φ(u,v−Δ)=π/2

Lower side pixel Ptd: φ(u,v+Δ)=0

Hence, the amount of variation in the disparity gradient direction φ in the image horizontal direction is determined using Expression (14), shown below, and the amount of variation in the disparity gradient direction φ in the image vertical direction is determined using Expression (15), shown below.

$$Pu(u,v)=\sin[\pi/2-0]=1 \qquad (14)$$

$$Pv(u,v)=\sin[0-\pi/2]=-1 \qquad (15)$$

As a result, the value of the first score $C_{LL}$ is 0, the value of the second score $C_{LR}$ is 0, the value of the third score $C_{RL}$ is −2, and the value of the fourth score $C_{RR}$ is +2.

Note that when the focus pixel Pt does not constitute any of the boundary lines 7, 8, 22, 23, respective absolute values of the scores $C_{LL}$, $C_{LR}$, $C_{RL}$, $C_{RR}$ are small. For example, when the focus pixel Pt and the respective pixels Ptl, Ptr, Ptu, Ptd are all pixels constituting the road surface region 4, the respective disparity gradient directions φ of the pixels are all π/2. Accordingly, the variation amount Pu (u, v) in the image horizontal direction and the variation amount Pv (u, v) in the image vertical direction are respectively 0. As a result, all of the scores $C_{LL}$, $C_{LR}$, $C_{RL}$, $C_{RR}$ take values of 0.

As described above, a determination as to whether or not the focus pixel Pt is a pixel constituting one of the boundary lines 7, 8, 22, 23 can be made, and the boundary line constituted by the focus pixel Pt can be identified, on the basis of the scores $C_{LL}$, $C_{LR}$, $C_{RL}$, $C_{RR}$ calculated in relation to the focus pixel Pt. The step candidate point extraction unit 13 according to this embodiment allocates labels indicating maximum score values to the respective pixels of the disparity image. For example, a label LL indicating the upper left boundary is allocated to the pixel in which the first score $C_{LL}$, among the respective scores $C_{LL}$, $C_{LR}$, $C_{RL}$, $C_{RR}$, takes a maximum value. Further, a label LR indicating the lower left boundary, a label RL indicating the lower right boundary, and a label RR indicating the upper right boundary are allocated respectively to the pixel in which the second score $C_{LR}$ takes a maximum value, the pixel in which the third score $C_{RL}$ takes a maximum value, and the pixel in which the fourth score $C_{RR}$ takes a maximum value.

Note, however, that when the maximum value of the score $C_{LL}$, $C_{LR}$, $C_{RL}$, $C_{RR}$ of the pixel falls below a predetermined threshold Cth (1, for example), the step candidate point extraction unit 13 determines that the pixel does not belong to any of the boundary lines 7, 8, 22, 23. The threshold is determined such that when the angle formed by the disparity gradient directions φ of the two pixel regions (the left side pixel Ptl and the right side pixel Ptr) positioned on either side of the focus pixel Pt in the u axis direction (a first direction) is within the predetermined angular range of a right angle and the angle formed by the disparity gradient directions φ of the two pixel regions (the upper side pixel Ptu and the lower side pixel Ptd) positioned on either side of the focus pixel Pt in the v axis direction (a second direction) is within the predetermined angular range of a right angle, step candidate points can be extracted with a high degree of precision.

For example, the value of the threshold Cth is set such that when the magnitude of the angle formed by the disparity gradient direction φ of the left side pixel Ptl and the disparity gradient direction φ of the right side pixel Ptr is (π/2)±the predetermined angle and the magnitude of the angle formed by the disparity gradient direction ϕ of the upper side pixel Ptu and the disparity gradient direction ϕ of the lower side pixel Ptd is (π/2)±the predetermined angle, the maximum score of the focus pixel Pt equals or exceeds the threshold Cth. After determining that the determination subject pixel does not belong to any of the boundary lines 7, 8, 22, 23, the step candidate point extraction unit 13 does not allocate a label to the pixel. The step candidate point extraction unit 13 generates step candidate point information for each pixel of the disparity image, in which the position (u, v) of the pixel is associated with the label LL, LR, RL, RR indicating the boundary. No labels are associated with pixels that have been determined not to belong to any of the boundary lines 7, 8, 22, 23 in the step candidate point information.

FIG. 8 shows step candidate points serving as candidates of the left side upper side boundary line 8, extracted in the manner described above. As is evident in comparison with FIG. 3, step candidate points are extracted continuously and at a high density along the upper side outer corner portion of the left side curb. It can also be seen that the step candidate points are extracted into the distance.

FIG. 9 shows step candidate points serving as candidates of the left side lower side boundary line 7, extracted in the manner described above. Step candidate points are extracted continuously and at a high density along the left side lower side inner corner portion. It can also be seen that the step candidate points are extracted into the distance. Furthermore, as can be seen by comparing FIG. 8 and FIG. 9, the candidate point group of the upper side boundary line 8 and the candidate point group of the lower side boundary line 7 are distributed in different regions, and therefore the 2 boundary lines can be differentiated clearly.

The coordinate conversion unit 14 projects the step candidate points on the disparity image, extracted by the step candidate point extraction unit 13, onto a road plane. In other words, the coordinate conversion unit 14 calculates coordinates (x, y, z) of the step candidate points on the disparity image within a three-dimensional space. An x axis is an axis of the vehicle width direction, which is positive when heading toward the vehicle right side, for example. A y axis is an axis of a vertical direction, which is positive when heading upward, for example. A z axis is an axis of a vehicle front-rear direction (the optical axis direction of the cameras 2, 3), which is positive when heading toward the front of the vehicle, for example. A coordinate value x, y, z is determined using Expression I, shown below. Note that the calculated coordinates are coordinates having the positions of the right side camera 2 and the left side camera 3 as a reference. In Expression I, f denotes a focal length of the cameras 2, 3, Δx denotes a distance between the cameras 2, 3, and (cu, cv) denotes an image center position.

$$x = \frac{\Delta x (u - c_u)}{d(u, v)}, \quad y = \frac{\Delta x (v - c_v)}{d(u, v)}, \quad z = \frac{\Delta x f}{d(u, v)} \quad \text{[Expression I]}$$

The road boundary line detection unit 15 detects a boundary of the step surface existing alongside the road by joining together at least a part of a plurality of predetermined pixel regions extracted by the step candidate point extraction unit 13. The road boundary line detection unit 15 estimates the boundary by fitting a road model to a calculated group of three-dimensional candidate points. The road boundary line detection unit 15 detects a solid road boundary by fitting a straight line and a quadratic curve to coordinate-converted step candidate points (x, z). When (x, z) is used as the coordinate value, the straight line and the quadratic curve can be fitted on a bird's eye view (a two-dimensional plane). Note that model fitting may be performed in a three-dimensional space that also includes the height y, rather than in two dimensions.

(Straight Line Fitting)

Referring to FIG. 10, straight line fitting will be described. The road boundary line detection unit 15 applies straight line fitting processing to the respective boundary lines 7, 8, 22, 23 individually. In other words, the road boundary line detection unit 15 performs straight line fitting on the left side upper side boundary line 8 using the step candidate point group to which the upper left boundary LL has been allocated as a subject. Similarly, the road boundary line detection unit 15 performs straight line fitting respectively on the left side lower side boundary line 7, the right side lower side boundary line 23, and the right side upper side boundary line 22 using the step candidate point groups to which the corresponding labels have been allocated as subjects. In this embodiment, the road boundary line detection unit 15 performs straight line fitting and quadratic curve fitting, to be described below, on the lower side boundary lines 7, 23 first.

For example, the road boundary line detection unit 15 fits a straight line to the step candidate point group (xi, zi) (i=1, 2, ..., N) of the lower side boundary line 7 or the lower side boundary line 23 using Expression II and Expression III, shown below. A function $f_1(s)$ of Expression II expresses a degree of alignment between the point group and the straight line. A function g(x) of Expression III returns a steadily larger value as the value of x approaches 0. A straight line shown in FIG. 10 is determined by determining straight line parameters s={$s_0$, $s_1$}. As respective values of an x coordinate value (=$s_0$+$s_1$zi) of a certain step coordinate point on a straight line corresponding to a z coordinate value zi and an x coordinate value xi of the step coordinate point approach each other, a value of g ($s_0$+$s_1$zi−xi) of the step candidate point increases. As a result, the value of the function $f_1(s)$ serving as a sum total increases. The road boundary line detection unit 15 estimates the straight line parameters s={$s_0$, $s_1$} at which the function $f_1(s)$ reaches a maximum. Initial values $s_{ini}$ of the straight line parameters s are set at $s_{ini}$ ={center value of xi, 0}.

$$f_1(s) = \sum_{i=1}^{N} g(s_0 + s_1 z_i - x_i) \quad \text{[Expression II]}$$

$$g(x) = \exp\left(-\frac{x^2}{2\sigma^2}\right) \quad \text{[Expression III]}$$

Note that the range is determined according to Expressions (16), (17), shown below, for example, in consideration of the distance and angle between the vehicle 100 and the curb or the like. Moreover, σ is preferably set at approximately 0.1 [m]. Initial values of the function $f_1(s)$ and the parameters, as well as optimum parameters from the range, can be determined using a nonlinear optimization method (for example, S. Johnson, The NLopt nonlinear-optimization package, http://ab-initio.mit.edu/nlopt).

$$-10 \leq s_0 \leq 10 \quad (16)$$

$$-1 \leq s_1 \leq 1 \quad (17)$$

(Quadratic Curve Fitting)

The road boundary line detection unit 15 performs quadratic curve fitting in relation to a curb on a curved road. In this embodiment, the road boundary line detection unit 15 estimates quadratic curve parameters $s=\{s_0, s_1, s_2\}$ at which a function $f_2(s)$ defined by Expression IV, shown below, reaches a maximum. Of the quadratic curve parameters $s=\{s_0, s_1, s_2\}$, initial values of $s_0$ and $s_1$ may be set such that the optimum values obtained during straight line fitting are used as is. The new parameter $s_2$, meanwhile, is set at an initial value of 0 and in a range of $-0.01 < s_2 < 0.01$, for example.

$$f_2(s) = \sum_{i=1}^{N} g(s_0 + s_1 z_i + s_2 z_i^2 - x_i) \quad \text{[Expression IV]}$$

Following optimization of the quadratic curve fitting, the model to be employed, from among the straight line model and the quadratic curve model, is determined. The road boundary line detection unit 15 performs this determination on the basis of an optimum value $f_1\text{max}$ of the function $f_1(s)$ and an optimum value $f_2\text{max}$ of the function $f_2(s)$. Typically, $f_1\text{max} < f_2\text{max}$, but with a quadratic curve, overfitting may occur. Therefore, the optimum values are preferably weighted and compared. For example, the straight line model may be employed when Expression (18), shown below, is satisfied, and the quadratic curve model may be employed when Expression (19), shown below, is satisfied.

$$1.1 \times f_1\text{max} > f_2\text{max} \quad (18)$$

$$1.1 \times f_1\text{max} \leq f_2\text{max} \quad (19)$$

Note that when the optimum values $f_1\text{max}$, $f_2\text{max}$ are lower than a predetermined lower limit value $\tau$, the fitting precision is considered to be low. For example, the extracted step candidate point group may include a large number of pixels not obtained from the captured image of the solid road boundary or the like. When the optimum values $f_1\text{max}$, $f_2\text{max}$ are lower than the predetermined lower limit value $\tau$, the road boundary line detection unit 15 performs similar boundary line detection processing on the upper side boundary lines 8, 22. For example, when the optimum values $f_1\text{max}$, $f_2\text{max}$ are lower than the predetermined lower limit value $\tau$ in relation to the left side lower side boundary line 7, straight line fitting and quadratic curve fitting are performed on the upper side boundary line 8. When, as a result, the optimum values $f_1\text{max}$, $f_2\text{max}$ are lower than the predetermined lower limit value $\tau$ likewise in relation to the upper side boundary line 8, it is determined that a step surface such as a curb does not exist.

Referring to a flowchart shown in FIG. 1, an operation of the boundary detection apparatus 1 according to this embodiment will be described. A control flow shown in FIG. 1 is executed repeatedly at predetermined period intervals, for example at the frame rate of the cameras 2, 3.

First, in step S10, a disparity image generated by the image acquisition unit 11 and the distance data acquisition unit 12 is input. The step candidate point extraction unit 13 acquires the disparity image information generated by the distance data acquisition unit 12 from a storage unit or the like. After step S10 is executed, the processing advances to step S20.

In step S20, a disparity gradient is calculated by the step candidate point extraction unit 13. The step candidate point extraction unit 13 calculates the disparity gradient direction $\phi$ in relation to each pixel of the disparity image. After step S20 is executed, the processing advances to step S30.

In step S30, variation points of the disparity gradient directions $\phi$ are extracted by the step candidate point extraction unit 13. The step candidate point extraction unit 13 calculates the scores $C_{LL}$, $C_{LR}$, $C_{RL}$, $C_{RR}$ using each pixel of the disparity image as the focus pixel Pt. On the basis of the score of each pixel, the step candidate point extraction unit 13 extracts the variation points of the disparity gradient directions $\phi$, or in other words the step candidate points. After step S30 is executed, the processing advances to step S40.

In step S40, coordinate conversion is performed by the coordinate conversion unit 14. The coordinate conversion unit 14 converts the position (u, v) on the disparity image and the disparity value d (u, v) of the variation point of each disparity gradient direction $\phi$ extracted in step S30 into actual coordinates (x, y, z). After step S40 is executed, the processing advances to step S50.

In step S50, a boundary line is detected by the road boundary line detection unit 15. The road boundary line detection unit 15 detects the boundary line of a step surface such as a curb on the basis of the coordinates (x, y, z) calculated in step S40. After step S50 is executed, the processing advances to step S60.

In step S60, a detection result is output. The boundary detection apparatus 1 outputs information relating to the boundary line detected in step S50. After step S60 is executed, the control flow is terminated. The output boundary line information is transmitted to a vehicle control apparatus, for example. The vehicle control apparatus executes control such as recognition assistance, operation assistance, and travel assistance on the basis of the boundary line information. This assistance control includes, for example, notifying a driver of the existence of a step such as a curb, assisting driving operations to prevent the vehicle 100 from approaching the curb or the like, automatic travel control, and so on.

FIG. 11 shows a detection result relating to the lower side boundary line 7 as an example of a detection result obtained by the boundary detection apparatus 1 in relation to a left side curb. It is evident from FIG. 11 that the lower side boundary line 7 can be detected with a high degree of precision even in a distant location. With the boundary detection apparatus 1 according to this embodiment, therefore, a solid road boundary can be detected with a high degree of precision even in a region where the amount of variation in the disparity value d on the disparity image is small.

As described above, the boundary detection apparatus 1 according to this embodiment includes the image acquisition unit 11, the distance data acquisition unit 12, the step candidate point extraction unit 13, and the road boundary line detection unit 15, and the predetermined pixel region extracted by the step candidate point extraction unit 13 is a pixel region in which the angle formed by the disparity gradient direction $\phi 3$ of the region (the left side pixel Ptl, for example) on one side of the predetermined pixel region (the focus pixel Pt) and the disparity gradient direction $\phi 1$ of the region (the right side pixel Ptr, for example) on the other side is within the predetermined angular range of a right angle.

The boundary detection apparatus 1 according to this embodiment is capable of detecting a solid road boundary existing within a captured image of the peripheral environment of a vehicle with a high degree of precision on the basis of variation in the disparity gradient direction $\phi$. By detecting the boundary line on the basis of the disparity gradient direction $\phi$, a boundary line in a region where variation in the disparity value d is small can likewise be detected with a high degree of precision. With the boundary detection apparatus 1 according to this embodiment, the position of a very small step can be detected with a high degree of precision by calculating not only the disparity gradient direction ϕ, but also the amount of variation in the disparity gradient direction ϕ. Furthermore, upper end and lower end candidates of the curb (the step) are extracted directly from the disparity image, and therefore information loss is small in comparison with a method employing discretization, such as a height map. Moreover, even in a region where variation in the brightness value is small, candidate points can be extracted from angular differences in the disparity gradient direction ϕ. Since the step candidate points are determined on the image in advance, coordinate conversion is performed without the need for discretization, and therefore the fitting precision of the road boundary line is improved.

Further, the predetermined pixel region according to this embodiment is a pixel region in which the angle formed by the disparity gradient directions ϕ of the two pixel regions (the left side pixel Ptl and the right side pixel Ptr) positioned on either side of the predetermined pixel region (the focus pixel Pt) in the first direction (the u axis direction) is within the predetermined angular range of a right angle and the angle formed by the disparity gradient directions ϕ of the two pixel regions (the upper side pixel Ptu and the lower side pixel Ptd) positioned on either side of the predetermined pixel region in the second direction (the v axis direction) is within the predetermined angular range of a right angle. By determining the respective angles formed by the disparity gradient directions ϕ of the two regions sandwiching the predetermined pixel region in two substantially orthogonal directions (the first direction and the second direction), the boundary can be detected with a high degree of precision.

Furthermore, the step candidate point extraction unit 13 according to this embodiment determines whether the predetermined pixel region is a boundary on the upper side or the lower side of the step surface on the basis of the disparity gradient directions ϕ of the two pixel regions positioned on either side of the predetermined pixel region in the first direction and the disparity gradient directions ϕ of the two pixel regions positioned on either side of the predetermined pixel region in the second direction. For example, pixels in which the first score $C_{LL}$ is high and pixels in which the fourth score $C_{RR}$ is high can be classified as an upper side boundary. Further, pixels in which the second score $C_{LR}$ and the third score $C_{RL}$ are high can be classified as a lower side boundary. The road boundary line detection unit 15 joins together the step candidate points classified as the upper side boundary of the step surface, and joins together the step candidate points classified as the lower side boundary of the step surface. Fitting is then executed on the separated candidate point groups relating respectively to the upper side boundary and the lower side boundary, and as a result, the precision of the straight line fitting and quadratic curve fitting is improved.

Moreover, the step candidate point extraction unit 13 according to this embodiment determines whether the predetermined pixel region is a boundary of a step surface positioned on the left side or the right side of the road on the basis of the disparity gradient directions ϕ of the two pixel regions positioned on either side of the predetermined pixel region in the first direction and the disparity gradient directions ϕ of the two pixel regions positioned on either side of the predetermined pixel region in the second direction. For example, when the disparity gradient direction ϕ of one of the two pixel regions is π or an angle in the vicinity of π, the detected boundary line can be classified as a left side solid road boundary. More specifically, when the focus pixel Pt is on the left side lower side boundary line 7, as shown in FIG. 6, the disparity gradient directions ϕ of the left side pixel Ptl and the upper side pixel Ptu are π or an angle in the vicinity of π. Further, when the focus pixel Pt is on the left side upper side boundary line 8, as shown in FIG. 7, the disparity gradient directions ϕ of the right side pixel Ptr and the lower side pixel Ptd are π or an angle in the vicinity of π.

When, on the other hand, the disparity gradient direction ϕ of one of the 2 pixel regions is 0 or an angle in the vicinity of 0, the detected boundary line can be classified as a right side solid road boundary. When the focus pixel Pt is on the right side lower side boundary line 23, as shown in FIG. 7, the disparity gradient directions ϕ of the right side pixel Ptr and the upper side pixel Ptu are 0 or angle in the vicinity of 0. Further, when the focus pixel Pt is on the right side upper side boundary line 22, the disparity gradient directions ϕ of the left side pixel Ptl and the lower side pixel Ptd are 0 or angle in the vicinity of 0. The road boundary line detection unit 15 joins together the step candidate points classified as the boundary of the step surface positioned on the left side, and joins together the step candidate points classified as the boundary of the step surface positioned on the right side. Fitting is then executed on the separated candidate point groups relating respectively to the left side step surface and the right side step surface, and as a result, the precision of the straight line fitting and quadratic curve fitting is improved.

Further, in this embodiment, a following boundary detection method is disclosed. The boundary detection method according to this embodiment includes: an acquisition procedure (step S10) in which a disparity image is acquired on the basis of information obtained by capturing an image of a peripheral environment of a vehicle; an extraction procedure (steps S20, S30) in which predetermined pixel regions are extracted from respective pixel regions constituting the disparity image on the basis of disparity gradient directions of the pixel regions; and a detection procedure (steps S40, S50) in which a boundary of a step surface existing alongside a road is detected by joining together at least some of the plurality of predetermined pixel regions extracted in the extraction procedure.

Here, the predetermined pixel region is a pixel region in which the angle formed by the disparity gradient direction ϕ3 of the region (the left side pixel Ptl, for example) on one side of the predetermined pixel region (the focus pixel Pt) and the disparity gradient direction ϕ1 of the region (the right side pixel Ptr, for example) on the other side is within the predetermined angular range of a right angle. The predetermined pixel region is a pixel region in which the angle formed by the disparity gradient directions ϕ of the two pixel regions (the left side pixel Ptl and the right side pixel Ptr) positioned on either side of the predetermined pixel region (the focus pixel Pt) in the first direction (the u axis direction) is within the predetermined angular range of a right angle and the angle formed by the disparity gradient directions ϕ of the two pixel regions (the upper side pixel Ptu and the lower side pixel Ptd) positioned on either side of the predetermined pixel region (the focus pixel Pt) in the second direction (the v axis direction), which is substantially orthogonal to the first direction, is within the predetermined angular range of a right angle. Using the boundary detection method described above, the boundary detection apparatus 1 according to this embodiment can detect the boundary lines 7, 8, 22, 23 with a high degree of precision.

First Modified Example of Embodiment

Aggregation of Plurality of Frames

A first modified example of the embodiment will now be described. A large amount of noise is included in the step candidate points extracted in each frame, and it is therefore effective to aggregate a plurality of frames in order to suppress this noise. For this purpose, a damping factor α is preferably set, whereupon previous gradient variation amounts $Pu^{(t-1)}$ (u, v), $Pv^{(t-1)}$ (u, v) are weighted and added using update expressions shown below in Expression V and Expression VI. When α is set at an excessively small value in the update expressions, an undesirable result may be obtained in a case where a curvature of the road varies or a pitch angle varies. The value of the damping factor α is set at 0.5, for example.

$$P_u(u,v) \leftarrow (1-\alpha)P_u^{(t-1)}(u,v) + \alpha P_u(u,v) \qquad \text{[Expression V]}$$

$$P_v(u,v) \leftarrow (1-\alpha)P_v^{(t-1)}(u,v) + \alpha P_v(u,v) \qquad \text{[Expression VI]}$$

According to this modified example, by weighting and adding the previous gradient variation amounts in order to aggregate a plurality of frames, the extraction result can be improved in stability.

Second Modified Example of Embodiment

Gradient Calculation Based on Fourier Analysis

A second modified example of the embodiment will now be described. A gradient direction calculation method that uses an analysis signal and takes into consideration a global gradient distribution, as in L. Cohen, Time Frequency Analysis, Prentice Hall Signal Processing Series, Prentice Hall, N.J., 1995, for example, may be employed. The disparity gradient directions ϕ are determined using an expression shown below in Expression VII. A convolution operation in this expression is equivalent to an operation to determine an imaginary number part of a result obtained by implementing a one-dimensional FFT on the disparity value d (u, v) in the u (or v) direction, and then implementing an inverse FFT with a positive frequency component set at a multiple of 2 and a negative frequency component set at 0.

$$\phi(u,v) = a\tan2\left[\frac{1}{\pi v} * d(u,v), \frac{1}{\pi u} * d(u,v)\right] \qquad \text{[Expression VII]}$$

The step candidate point extraction unit 13 according to this modified example uses a gradient direction calculation method based on a Fourier phase difference during the processing for determining the disparity gradient directions ϕ. When the disparity gradient directions ϕ are calculated only on the basis of local features, local noise has an effect. In this modified example, a global gradient distribution generated by Fourier phase difference analysis is taken into consideration in addition to local features, and therefore noise factors can be dispersed, with the result that the step candidate points can be extracted with greater stability.

Third Modified Example of Embodiment

Modification of Window Size

A third modified example of the embodiment will now be described. An apparent size of the curb step on the image varies in accordance with the distance from the cameras 2, 3. A curb positioned close to the cameras 2, 3 appears large on the image, whereas a curb in a distant position appears small on the image. Accordingly, the window size, or in other words the distance Δ between the focus pixel Pt and the respective peripheral pixels Ptl, Ptr, Ptu, Ptd, may be varied on the basis of the distance information. The distance information is the disparity value d (u, v) of the focus pixel Pt, for example. The value of the distance Δ is smaller when the disparity value d is small than when the disparity value d is large. Hence, variation in the disparity gradient direction ϕ can be detected at an appropriate window size, and as a result, step candidate points can be extracted with a high degree of precision further into the distance. The distance Δ may be varied either continuously or in steps in accordance with variation in the distance information.

Furthermore, an aspect ratio of the window side may be varied. For example, even when the shape of a disposed curb remains constant, the shape of the curb on the image differs depending on whether the road ahead is a straight road or a curved road. A vertical surface (the side face) of a left side curb disposed on a rightward curved road is oriented more closely to a sight line direction of the cameras 2, 3 than a left side curb disposed on a straight road. In other words, the vertical surface of a left side curb on a rightward curved road appears to be wider than the vertical surface of a left side curb on a straight road. Accordingly, variation in the disparity gradient direction ϕ can be learned more correctly by providing a window shape that is wide in the horizontal direction in relation to a left side curb of a rightward curved road. Note that it is possible to predict whether or not the road ahead is a curved road (road curvature) from estimation values obtained during the quadratic curve fitting applied to the previously observed boundary lines 7, 8, 22, 23. The road boundary line detection unit 15 preferably sets the window shape to be steadily wider as the road curvature of the curved road ahead increases, or in other words as the road curves more sharply, for example. The aspect ratio of the window shape may be varied either continuously or in steps in accordance with the road curvature.

The step candidate point extraction unit 13 according to this modified example varies the window size (the distance Δ) and the aspect ratio of the window while extracting gradient variation in accordance with the distance information of the focus pixel Pt and the boundary curvature. In so doing, the window size can be modified in accordance with the distance and the appearance of the curved surface, and as a result, the step candidate points can be extracted with stability.

Fourth Modified Example of Embodiment

Window Rotation

Figure 12:
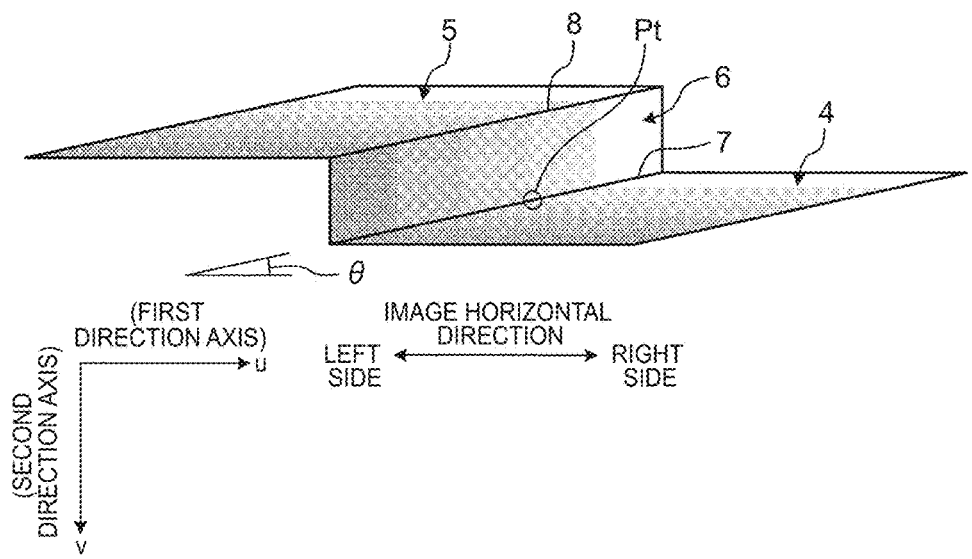
FIG. 12 is a view showing a disparity image according to a fourth modified example of the embodiment.
Figure 13:
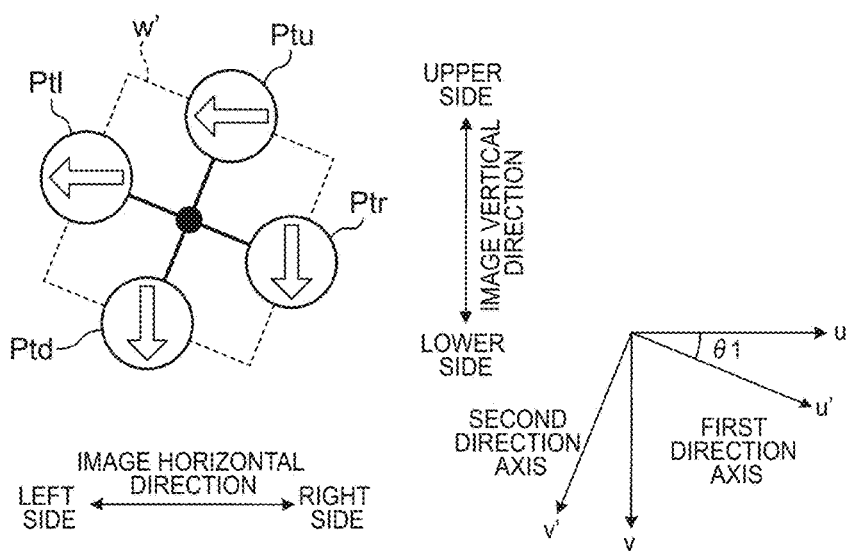
FIG. 13 is a view showing a window according to the fourth modified example of the embodiment.

A fourth modified example of the embodiment will now be described. FIG. 12 is a view showing a disparity image according to the fourth modified example of the embodiment, and FIG. 13 is a view showing a window according to the fourth modified example of the embodiment. When, in the drawings, an incline of the boundary line relative to the image horizontal direction is small, it is effective to rotate the window. The window may be rotated in combination with modification of the window size, as described above. As shown in FIG. 12, when an angle θ formed by the boundary lines 7, 8 and the image horizontal direction is small, it may be impossible to detect variation in the disparity gradient direction ϕ with a high degree of precision. When the right side pixel Ptr and the left side pixel Ptl are both points on the u axis, as shown in FIG. 6, one of the two pixels may overlap the lower side boundary line 7 or the like, and as a result, it may be impossible to detect variation in the disparity gradient direction φ appropriately. The angle θ may decrease when a curb disposed on a curved road ahead is detected, for example. When a curb of a curved road exists directly in front of the vehicle 100, the angle θ is small. Accordingly, the angles formed by the boundary lines 7, 8, 22, 23 and the u axis direction are likely to be small, and as a result, it may be impossible to detect variation in the disparity gradient direction φ with a high degree of precision.

In response to this problem, the window w shown in FIG. 6 is preferably rotated. As shown in FIG. 13, for example, the window is rotated about a solid road boundary shown in FIG. 12. In the rotated window w', a u' axis and a v' axis shown in FIG. 13 serve as the axes. When the step candidate points of the left side solid road boundary are extracted, the window is preferably rotated clockwise by a predetermined angle θ1. In so doing, an angle formed by the u' axis, which is the axis of the first direction following rotation, and the boundary lines 7, 8 can be increased. The right side pixel Ptr and the left side pixel Ptl respectively sandwich the focus pixel Pt in the u' axis direction. Further, the upper side pixel Ptu and the lower side pixel Ptd respectively sandwich the focus pixel Pt in the v' axis direction.

Respective inclines of the boundary lines 7, 8 can be predicted or estimated from detection results obtained previously by the road boundary line detection unit 15, for example. Further, the disparity image can be divided into a plurality of regions in accordance with the distance from the cameras 2, 3, and step boundaries can be extracted in sequence from the region closest to the cameras 2, 3. It is also effective to set an incline of a window to be used in a distant region on the basis of a boundary line detection result obtained in a nearby region. In so doing, step candidate points can be detected with a high degree of precision further into the distance when extracting a step boundary at a curve entrance or the like.

When step candidate points of a right side solid road boundary are extracted, the window w shown in FIG. 6 is preferably rotated counterclockwise. In so doing, the angle formed by the first direction (the u' axis direction) following rotation and the boundary lines 22, 23 can be increased.

The step candidate point extraction unit 13 according to this modified example rotates the upper, lower, left, and right side reference pixels in accordance with the boundary curvature when determining the amount of variation in the disparity gradient directions φ on the periphery of the focus pixel Pt. Hence, the window is rotated in accordance with the appearance of the step surface (the incline of the step boundary on the image), and as a result, the step candidate points can be extracted with greater stability.

Fifth Modified Example of Embodiment

Figure 14:
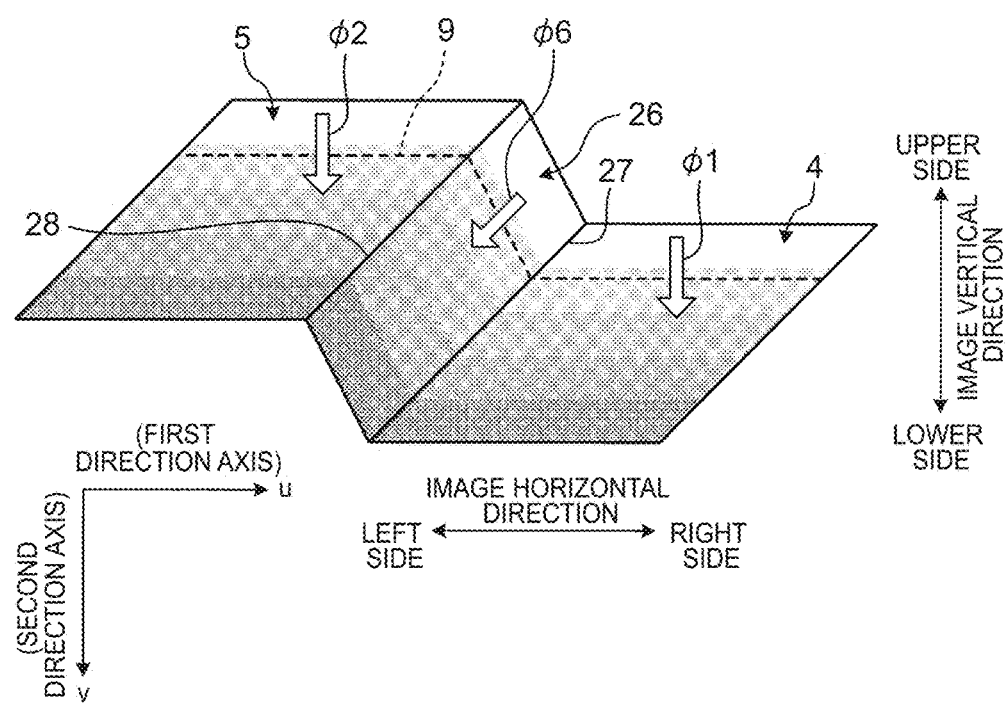
FIG. 14 is an illustrative view relating to a fifth modified example of the embodiment.

A fifth modified example of the embodiment will now be described. FIG. 14 is an illustrative view relating to the fifth modified example of the embodiment. In the embodiment described above, the step surface is formed at a right angle or substantially at a right angle to the road surface of the road. However, the step surface angle that can be detected by the boundary detection apparatus 1 is not limited thereto. The boundary detection apparatus 1 is also capable of detecting a step surface that is inclined by a predetermined angle relative to the road surface of the road, for example.

A slope of a bank or the like, for example, may be cited as an example of this type of step surface. The boundary detection apparatus 1 is also capable of detecting boundary lines of a lower end and an upper end of a slope.

A disparity image shown in FIG. 14 includes the road surface region 4, the sidewalk region 5, and a step surface region 26. The step surface region 26 is a region obtained by capturing an image of a step surface that is inclined by a predetermined incline angle, such as a slope. A disparity gradient direction φ6 in the step surface region 26 is an inclined direction relative to the u axis and the v axis. Step candidate points of a lower side boundary line 27 and an upper side boundary line 28 can be extracted in relation to this type of inclined step surface in a similar manner to the embodiment described above. When the disparity gradient direction φ6 is inclined relative to the u axis, the respective maximum values of the scores $C_{LL}$, $C_{LR}$, $C_{RL}$, $C_{RR}$ are smaller than when the disparity gradient direction φ6 is parallel to the u axis direction. Therefore, when an inclined step surface is subjected to extraction, the threshold Cth is preferably reduced in comparison with a case in which a vertical surface is subjected to extraction. The threshold Cth is preferably determined appropriately in accordance with the incline angle of the step surface to be included in the detection subject.

Sixth Modified Example of Embodiment

A sixth modified example of the embodiment will now be described. In the above embodiment, the pixel region is mainly constituted by a single pixel, but the pixel region may be a collection of a plurality of pixels. For example, when the focus pixel Pt is determined to be on one of the boundary lines 7, 8, 22, 23, the pixel adjacent to the focus pixel Pt may be determined to be a pixel constituting the same boundary line 7, 8, 22, 23. In other words, when a representative pixel of a pixel region constituted by a plurality of pixels is set at the focus pixel Pt, and the focus pixel Pt is a pixel constituting one of the boundary lines 7, 8, 22, 23, all of the pixels constituting the pixel region may be determined to be included on the same boundary line 7, 8, 22, 23.

Further, the respective pixels Ptl, Ptr, Ptu, Ptd may be pixel regions constituted by pluralities of pixels, rather than single pixels. For example, an average value or a center value of the disparity gradient directions φ of a plurality of adjacent pixels may be used as the value of the disparity gradient direction φ when calculating the respective variation amounts Pu (u, v), Pv (u, v). For example, the left side pixel Ptl and the right side pixel Ptr may respectively be pixel regions constituted by pluralities of pixels, and the amounts of variation in the disparity gradient directions φ may be calculated using center values or average values of the disparity gradient directions φ of the respective pixel regions.

Seventh Modified Example of Embodiment

A seventh modified example of the embodiment will now be described. Instead of extracting the step candidate points on the basis of the scores $C_{LL}$, $C_{LR}$, $C_{RL}$, $C_{RR}$, as in the above embodiment, the step candidate points may be extracted by calculating respective angles formed by the disparity gradient directions φ. For example, when the magnitude of an angle formed by the disparity gradient direction φ of the upper side pixel Ptu and the disparity gradient direction φ of the lower side pixel Ptd is within a range of (π/2)±a predetermined angle or a range of $(37\pi/2)\pm$a predetermined angle, a first condition for determining a step candidate point is assumed to be satisfied. Further, when the magnitude of an angle formed by the disparity gradient direction ϕ of the left side pixel Ptl and the disparity gradient direction ϕ of the right side pixel Ptr is within a range of $(\pi/2)\pm$a predetermined angle or a range of $(37\pi/2)\pm$a predetermined angle, a second condition for determining a step candidate point is assumed to be satisfied. When the first condition and the second condition for determining a step candidate point are both established, the focus pixel Pt is extracted as a step candidate point.

Eighth Modified Example of Embodiment

An eighth modified example of the embodiment will now be described. In the above embodiment, the disparity image is generated on the basis of a stereo image captured by the right side camera 2 and the left side camera 3. The invention is not limited thereto, however, and the disparity image may be generated on the basis of a stereo image captured by a single lens camera.

Ninth Modified Example of Embodiment

A ninth modified example of the embodiment will now be described. In the above embodiment, the first direction (for example, the u axis direction) and the second direction (for example, the v axis direction) are orthogonal, but the invention is not limited to a case in which the first direction and the second direction intersect each other perpendicularly. For example, the second direction may be substantially orthogonal to the first direction.

The content disclosed in the embodiment and modified examples described above may be executed in appropriate combinations.

What is claimed is:

1. A boundary detection apparatus comprising:
an acquisition unit configured to acquire a disparity image based on information obtained by capturing an image of a peripheral environment of a vehicle, the disparity image including a first pixel region and a second pixel region;
an extraction unit configured to extract predetermined pixel regions from the first pixel region and the second pixel region based on a disparity gradient direction of the first pixel region and a disparity gradient direction of the second pixel region; and
a detection unit configured to detect a boundary of a step surface existing alongside a road by joining together at least some of the predetermined pixel regions extracted by the extraction unit,
wherein the first pixel region and the second pixel region sandwich the predetermined pixel region,
the first pixel region and the second pixel region collectively comprise a first pixel, a second pixel, a third pixel, and a fourth pixel,
the first pixel and the third pixel are positioned on either side of the predetermined pixel region in a first direction,
the second pixel and the fourth pixel are positioned on either side of the predetermined pixel region in a second direction,
an angle formed by a first disparity gradient direction of the first pixel and a third disparity gradient direction of the third pixel is within a predetermined angular range of a right angle, and an angle formed by a second disparity gradient direction of the second pixel and a fourth disparity gradient direction of the fourth pixel is within a predetermined angular range of a right angle.

2. The boundary detection apparatus according to claim 1, wherein
the first pixel region includes the first pixel and the second pixel,
the second pixel region includes the third pixel and the fourth pixel, and
the second direction is substantially orthogonal to the first direction.

3. The boundary detection apparatus according to claim 2, wherein
the extraction unit is configured to determine whether the predetermined pixel region constitutes a boundary on an upper side or a lower side of the step surface based on the first disparity gradient direction of the first pixel, the second disparity gradient direction of the second pixel, the third disparity gradient direction of the third pixel, and the fourth disparity gradient direction of the fourth pixel, and
the detection unit is configured to join together the predetermined pixel regions determined to constitute the boundary on the upper side of the step surface, and to join together the predetermined pixel regions determined to constitute the boundary on the lower side of the step surface.

4. The boundary detection apparatus according to claim 2, wherein
the extraction unit is configured to determine whether the predetermined pixel region constitutes a boundary of the step surface positioned on a left side or a right side of the road based on the first disparity gradient direction of the first pixel, the second disparity gradient direction of the second pixel, the third disparity gradient direction of the third pixel, and the fourth disparity gradient direction of the fourth pixel, and
the detection unit is configured to join together the predetermined pixel regions determined to constitute the boundary of the step surface positioned on the left side, and to join together the predetermined pixel regions determined to constitute the boundary of the step surface positioned on the right side.

5. A boundary detection method comprising:
acquiring a disparity image based on information obtained by capturing an image of a peripheral environment of a vehicle, the disparity image including a first pixel region and a second pixel region;
extracting predetermined pixel regions from the first pixel region and the second pixel region based on a disparity gradient direction of the first pixel region and a disparity gradient direction of the second pixel region; and
detecting a boundary of a step surface existing alongside a road by joining together at least some of the extracted predetermined pixel regions,
wherein the first pixel region and the second pixel region sandwich the predetermined pixel region,
the first pixel region and the second pixel region collectively comprise a first pixel, a second pixel, a third pixel, and a fourth pixel,
the first pixel and the third pixel are positioned on either side of the predetermined pixel region in a first direction,
the second pixel and the fourth pixel are positioned on either side of the predetermined pixel region in a second direction, an angle formed by a first disparity gradient direction of the first pixel and a third disparity gradient direction of the third pixel is within a predetermined angular range of a right angle, and an angle formed by a second disparity gradient direction of the second pixel and a fourth disparity gradient direction of the fourth pixel is within a predetermined angular range of a right angle.

6. A boundary detection apparatus comprising:

an acquisition unit configured to acquire a disparity image based on information obtained by capturing an image of a peripheral environment of a vehicle, the disparity image including a first pixel region and a second pixel region;

an extraction unit configured to extract predetermined pixel regions from the first pixel region and the second pixel region based on a disparity gradient direction of the first pixel region and a disparity gradient direction of the second pixel region; and a detection unit configured to detect a boundary of a step surface existing alongside a road by joining together at least some of the predetermined pixel regions extracted by the extraction unit, wherein the first pixel region and the second pixel region sandwich the predetermined pixel region, an angle formed by the disparity gradient direction of the first pixel region and the disparity gradient direction of the second pixel region is within a predetermined angular range of a right angle, the first pixel region includes a first pixel and a second pixel, the second pixel region includes a third pixel and a fourth pixel, the first pixel and the third pixel are positioned on either side of the predetermined pixel region in a first direction, an angle formed by a first disparity gradient direction of the first pixel and a third disparity gradient direction of the third pixel is within a predetermined angular range of a right angle, the second pixel and the fourth pixel are positioned on either side of the predetermined pixel region in a second direction that is substantially orthogonal to the first direction, and an angle formed by a second disparity gradient direction of the second pixel and a fourth disparity gradient direction of the fourth pixel is within a predetermined angular range of a right angle.

7. The boundary detection apparatus according to claim 2, wherein the extraction unit is configured to determine whether the predetermined pixel region constitutes a boundary on an upper side or a lower side of the step surface based on the first disparity gradient direction of the first pixel, the second disparity gradient direction of the second pixel, the third disparity gradient direction of the third pixel, and the fourth disparity gradient direction of the fourth pixel, and the detection unit is configured to join together the predetermined pixel regions determined to constitute the boundary on the upper side of the step surface, and to join together the predetermined pixel regions determined to constitute the boundary on the lower side of the step surface.

8. The boundary detection apparatus according to claim 2, wherein the extraction unit is configured to determine whether the predetermined pixel region constitutes a boundary of the step surface positioned on a left side or a right side of the road based on the first disparity gradient direction of the first pixel, the second disparity gradient direction of the second pixel, the third disparity gradient direction of the third pixel, and the fourth disparity gradient direction of the fourth pixel, and the detection unit is configured to join together the predetermined pixel regions determined to constitute the boundary of the step surface positioned on the left side, and to join together the predetermined pixel regions determined to constitute the boundary of the step surface positioned on the right side.

* * * * *